United States Patent
Lee et al.

(10) Patent No.: US 9,657,162 B2
(45) Date of Patent: May 23, 2017

(54) BIO RESIN COMPOSITIONS, BIO MOLDED ARTICLE AND METHOD OF MANUFACTURING THE SAME

(71) Applicants: Hyundai Motor Company, Seoul (KR); Kia Motors Corporation, Seoul (KR); LG Hausys, Ltd., Seoul (KR)

(72) Inventors: Myoung-Ryoul Lee, Seoul (KR); Oh-Deok Kwon, Hwasung Gyeonggi-Do (KR); Su-Hyeong Yun, Busan (KR); Yong-Bae Jung, Chungcheongbuk-Do (KR); Yun-Ho Lee, Ulsan (KR); Kyo-Hoon Shin, Ulsan (KR); Chul-Hee Min, Ulsan (KR)

(73) Assignees: Hyundai Motor Company, Seoul (CN); Kia Motors Corporation, Seoul (KR); LG Hausys, Ltd., Seoul (KR)

( * ) Notice: Subject to any disclaimer, the term of this patent is extended or adjusted under 35 U.S.C. 154(b) by 117 days.

(21) Appl. No.: 14/142,861

(22) Filed: Dec. 29, 2013

(65) Prior Publication Data
US 2014/0288223 A1 Sep. 25, 2014

(30) Foreign Application Priority Data
Mar. 22, 2013 (KR) .................. 10-2013-0030997

(51) Int. Cl.
*C08L 23/00* (2006.01)
*C08L 23/10* (2006.01)

(52) U.S. Cl.
CPC ............... *C08L 23/00* (2013.01); *C08L 23/10* (2013.01)

(58) Field of Classification Search
CPC .......... C08L 23/00; C08L 23/04; C08L 23/06; C08L 23/10; C08L 23/12
See application file for complete search history.

(56) References Cited

U.S. PATENT DOCUMENTS 5,176,953 A * 1/1993 Jacoby ...................... C08J 5/18
428/315.5

FOREIGN PATENT DOCUMENTS

| | | |
|---|---|---|
| JP | 2006-097201 A | 4/2006 |
| KR | 10-2009-0116012 | 11/2009 |
| KR | 10-2012-0079905 | 7/2012 |

* cited by examiner

*Primary Examiner* — Wenwen Cai
(74) *Attorney, Agent, or Firm* — Mintz Levin Cohn Ferris Glovsky and Popeo, P.C.; Peter F. Corless

(57) ABSTRACT

Disclosed is a bio resin composition, a bio molded article, and a method of manufacturing the same. The bio resin composition is environmentally friendly and provides at least a predetermined level of physical properties, such as hardness, strength, and the like, by including a bio polyethylene resin, a thermoplastic olefin resin, a polypropylene resin, and an inorganic filter and by further including a thermoplastic rubber. The present composition reduces the generation of volatile organic compounds, and may increase the diversity of its use through injection molding.

8 Claims, No Drawings

BIO RESIN COMPOSITIONS, BIO MOLDED ARTICLE AND METHOD OF MANUFACTURING THE SAME

CROSS-REFERENCE TO RELATED APPLICATIONS

This application claims priority under 35 U.S.C. §119 to Korean Patent Application No. 10-2013-0030997, filed on Mar. 22, 2013, in the Korean Intellectual Property Office, the disclosure of which is incorporated herein by reference in its entirety.

BACKGROUND OF THE INVENTION

1. Field of the Invention

The present invention relates to a bio resin composition, a bio molded article, and a method of manufacturing the same, and more particularly, to a bio resin composition having a predetermined level of physical properties such as hardness, strength, and the like, generates a low level of volatile organic compounds (VOC), and is environmentally friendly. The bio resin composition of the present invention includes a bio polyethylene resin, a thermoplastic olefin resin, a polypropylene resin, an inorganic filter and a thermoplastic rubber.

2. Description of the Related Art

Synthetic resins that are widely used in our daily lives include polyethylene resins, polypropylene resins, polyvinyl chloride resins, acrylic resins, phenol resins, and the like. Compositions including the synthetic resin possess excellent moldability, impact resistance, and chemical resistance, and are low in specific gravity and price. As such, they are widely used in plastic molded articles and automotive interior and exterior materials.

However, a synthetic resin sheet is not environmentally friendly because it causes environmental pollution during its manufacture and the like, it is difficult to recycle after use, and it is extremely difficult to perform a post-treatment thereof.

A petroleum-based synthetic resin in the related art emits volatile organic compounds at high concentrations and, thus, also may be detrimental to the health of people who use such synthetic resins.

Accordingly, biomaterials are being developed which emit small amounts of volatile organic compounds while reducing environmental pollution. Korean Patent Application Laid-Open No. 2012-0047113 describes bio plastics and a method of manufacturing the same. This technology utilizes waste resources and reduces manufacturing costs by using agricultural waste as a raw material for the bioplastics. However, it is disadvantageous in terms of low physical properties of plastics produced.

In addition, Korean Patent No, 10-091016 describes a composition including a polyolefin resin in which ethylene and propylene are copolymerized. However, the composition includes general polyethylene and polyolefin resins, and thus it is still difficult to salve the aforementioned problem.

Korean Patent Application Laid-Open No. 2009-0131843 describes polypropylene/soy-protein compositions of bio-composite materials, a bio-composite sheet using the same and a manufacturing method thereof. However, since soy-protein is directly used, there is a problem in that the quality of the products varies depending on the state of a soy-protein.

Thus, there is a great need for an environmentally friendly bio molding composition which can replace non-environmentally friendly synthetic resin sheets and composite sheets, articles using the same, and the like.

SUMMARY OF THE INVENTION

The present invention provides a bio resin composition, a bio molded article, and a method of manufacturing the same which reduces the generation of volatile organic compounds. The composition possesses physical properties, such as light resistance, heat resistance, and the like, which are equivalent to those of a conventional material such as a petroleum-based polyethylene, by including a bio polyethylene resin, a thermoplastic olefin resin, a polypropylene resin, and an inorganic filter and by further including a thermoplastic rubber.

According to one aspect, the present invention provides a bio resin composition including: about 200 to 350 parts by weight of a thermoplastic olefin resin, about 10 to 20 parts by weight of a polypropylene resin, and about 10 to 20 parts by weight of an inorganic filler, based on 100 parts by weight of a bio polyethylene resin.

According to various embodiments, the bio polyethylene resin is obtained by polymerizing ethylene that has been produced by dehydrating bioethanol.

According to various embodiments, the inorganic filler includes one or more selected from the group consisting of calcium carbonate, calcium oxide, mica, talc, and the like.

According to various embodiments, the composition further includes about 5 to 40 parts by weight of a thermoplastic rubber.

According to various embodiments, the thermoplastic rubber is a copolymer of ethylene and a $C_2$ to $C_{10}$ α-olefin.

Preferably, the $C_2$ to $C_{10}$ α-olefin is propylene, butene, pentene, hexene, octene, or the like.

According to various embodiments, the thermoplastic rubber is one or more selected from the group consisting of ethylene-propylene rubber (EPR), ethylene-propylene-diene monomer (EPDM) rubber, ethylene-butene rubber (EBR), ethylene-octene rubber (EOR), and the like.

According to another aspect, the present invention provides a bio molded article manufactured from the bio resin composition.

According to another aspect, the present invention provides a method of manufacturing a bio molded article, including: preparing a mixture by uniformly mixing about 200 to 350 parts by weight of a thermoplastic olefin resin, about 10 to 20 parts by weight of a polypropylene resin, and about 10 to 20 parts by weight of an inorganic filler, based on 100 parts by weight of a bio polyethylene resin; preparing a melt by melting the uniformly mixed mixture; and manufacturing a bio molded article by passing the melt through a calender roll.

The present invention is advantageous in that the bio resin composition has very good moldability and excellent price competitiveness and sense of touch, and may be recycled for another use through several regeneration processes.

Furthermore, since a material to which the bio resin composition according to the present invention is applied has a lower generation of volatile organic compounds than that of a conventional petroleum-based material and thus is environmentally friendly, the material is appropriate for application as automotive interior and exterior materials, and its use may be diversified through injection molding.

In addition, unlike conventional petroleum-based compositions, which produce polyethylene while emitting carbon dioxide, a bio polyethylene resin included in the present invention is produced by polymerization of bioethanol that is produced from sugar cane and the like and thus generates less carbon dioxide.

Furthermore, the present invention is advantageous in that the composition is provided with a predetermined level of physical properties, such as hardness, strength, and the like, by including a bio polyethylene resin, a thermoplastic olefin resin, a polypropylene resin, and an inorganic filter and by further including a thermoplastic rubber. Other aspects and exemplary embodiments of the invention are discussed infra.

DETAILED DESCRIPTION OF THE EMBODIMENTS

Terms or words used in the present specification and claims should not be interpreted as being limited to typical or dictionary meanings, but should be interpreted as having meanings and concepts which comply with the technical spirit of the present invention, based on the principle that an inventor can appropriately define the concept of the term to describe his/her own invention in the best manner.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, the present invention will be described in detail, particularly with reference to the Tables.

In an aspect, the present invention relates to a bio resin composition and a bio molded article.

1. Constituent Components

The bio resin composition according to the present invention includes a bio polyethylene resin and the like as main components. Such a composition is unlike a conventional composition which consists of polyethylene and polypropylene resins, and the like as main components. The present invention is environmentally friendly and has physical properties equivalent to or better than those of the conventional polyethylene and polypropylene resins and the like based compositions. In particular, the present invention is provided with such characteristics by including a bio polyethylene resin, a thermoplastic olefin resin, a polypropylene resin, and an inorganic filter and by further including a thermoplastic rubber.

According to embodiments of the present invention, the bio resin composition includes about 200 to 350 parts by weight of a thermoplastic olefin (TPO) resin, about 10 to 20 parts by weight of a polypropylene (PP) resin, and about 10 to 20 parts by weight of an inorganic filler, based on 100 parts by weight of a bio polyethylene (Bio PE) resin. The present composition further includes about 5 to 40 parts by weight of a thermoplastic rubber, based on 100 parts by weight of the bio polyethylene (Bio PE) resin.

Each constituent component of the bio resin composition according to the present invention will be further described below.

1.1. Bio Polyethylene (Bio PE) Resin

The bio polyethylene resin is the main material of the present invention, and may be obtained by polymerizing ethylene that has been produced by dehydrating bioethanol. Preferably, a plant from which the bioethanol is prepared is referred to as bio mass as a bio resource, and when the bio mass is processed, it is possible to obtain liquid fuel such as biomethanol, bioethanol, biodiesel, and the like. In particular, it is preferred that the bioethanol used in the bio polyethylene resin of the present invention is prepared from one or more selected from the group consisting of corn, Jerusalem artichoke, sugar cane, sugar beet, and the like. In the case of the sugar cane or sugar beet, bioethanol may be obtained by directly extracting sugar therefrom and alcohol-fermenting the extracted sugar.

According to a preferred embodiment, the bio polyethylene resin is present in an amount of about 25 parts by weight or less based on 100 parts by weight of the bio resin composition. When the content of the bio polyethylene resin exceeds about 25 parts by weight, physical properties of the composition rapidly deteriorate and strength, an elongation rate, and the like are reduced, and thus it is difficult to manufacture a bio molded article using such amounts of the bio polyethylene resin.

1.2. Thermoplastic Olefin (TPO) Resin

The thermoplastic olefin resin is a material that increases melt strength and securing an appropriate sagging property during vacuum molding. Such, physical properties are particularly required in the calendering method of the bio molded composition. According to a preferred embodiment, the thermoplastic olefin resin includes at least one in state of full-crosslinking, half-crosslinking, and non-crosslinking, preferably wherein the thermoplastic olefin resin includes at least one resin in each state.

The thermoplastic olefin resin in the full-crosslinking state serves to suppress the extreme increases in elongation rate of the composition and to prevent deterioration in a trimming property after the composition is molded.

The thermoplastic olefin resin in the half-crosslinking state is composed of a structure in which polypropylene chains pass through the resin composition in the half-crosslinking state, and uniformly stretches when the composition is elongated by external forces. Thus, the half-crosslinking state serves to reduce the deviation in thickness of the composition.

The thermoplastic olefin resin of the present invention may also be present in a non-crosslinking state. The thermoplastic olefin resin in the non-crosslinking state has a lower melt strength than the thermoplastic olefin resins in the crosslinking and half-crosslinking states, but has a higher melt strength than the general olefin resin. When the bio resin composition includes a thermoplastic olefin resin in the non-crosslinking state, ethylene propylene rubber (EPR) is usually used as the thermoplastic rubber to be added. Such a thermoplastic olefin resin is advantageous in that the odor of the composition is not strong and changes in physical properties are small because a crosslinking agent is not used. However, during the molding of the composition, the deviation in thickness may be so severe that the thermoplastic olefin resin is disadvantageous in that bursting and whitening of the composition may occur.

According to preferred embodiments, the content of the thermoplastic olefin resin is about 200 to 350 parts by weight based on 100 parts by weight of a bio polyethylene resin. When the content of the thermoplastic olefin resin is less than about 200 parts by weight, there is a problem in that calendering workability and moldability may deteriorate due to a decrease in strength of the composition. On the other hand, when the content thereof exceeds about 350 parts by weight, there is a problem in that odor may be generated from the composition by a crosslinking initiator.

1.3. Polypropylene (PP) Resin

The polypropylene resin is a material that enhances the capacity of a bio molded article prepared from the bio resin composition to maintain its form.

As the polypropylene resin, any polypropylene resin known in the art may be used. Preferably, a homo type polypropylene composed of only a propylene, in which the odor of the composition is not strong and a change caused by temperature or light is small, is used.

Furthermore, it is preferred that the polypropylene resin has a number average molecular weight of about 30,000 to 40,000 and a melting index of about 25 to 40 g/10 minutes (230° C. 2.16 kg). It is further preferred that the polypropylene resin has a specific weight of about 0.89 to 0.91, a Shore A hardness of about 90 to 97, and an elongation rate of about 20 to 30% in order to minimize increases in elongation rate of the composition.

The content of the polypropylene resin is preferably about 10 to 20 parts by weight based on 100 parts by weight of the bio polyethylene resin. When the content of the polypropylene resin is less than about 10 parts by weight, the melt strength of the composition rapidly decreases, which may deteriorate moldability during molding processing. This is disadvantageous in that the bio resin composition is cured, and thus bursting of the composition may occur during vacuum molding of the composition and the texture of the bio molded article may deteriorate. In addition, when the content of the polypropylene resin exceeds 20 parts by weight, the appearance quality of the bio molded article may deteriorate.

1.4. Inorganic Filler

The inorganic filler is a material that enhances mechanical properties of the bio resin composition. Any conventional fillers may be used, and preferably the filler includes one or more selected from calcium carbonate, calcium oxide, mica, and talc.

The content of the inorganic filler is preferably about 10 to 20 parts by weight based on 100 parts by weight of the bio polyethylene resin. When the content of the inorganic filler is less than about 10 parts by weight, there is a problem in that the inorganic filler is combined with ethylene octene rubber (EOR), which is one of thermoplastic rubbers, thereby reducing the effect of the inorganic filler, and the bio resin compositions may adhere to each other when the composition is processed. On the other hand, when the content of the inorganic filler exceeds about 20 parts by weight, there is a problem in that bursting of the composition may occur due to an increase in hardness and a decrease in elongation rate of the composition during the molding process of the composition. Furthermore, it is preferred that the inorganic filler has a specific weight of about 2.6 and is at a fourth-rate or more odor level, which is not strong in accordance with the criteria for odor level evaluation with respect to a plastic product which is used for interior of an automobile in the auto industry.

1.5. Thermoplastic Rubber

The thermoplastic rubber is a component that reinforces impact resistance of the composition. While any conventional thermoplastic rubbers can be used, it is preferred that the thermoplastic rubber includes a copolymer of ethylene and a C2 to C10 α-olefin.

Any $C_2$ to $C_{10}$ α-olefin known in the art may be used as the $C_2$ to $C_{10}$ α-olefin. Preferably, the $C_2$ to $C_{10}$ α-olefin is selected the group consisting of propylene, butene, pentene, hexene, octene, and the like, and combinations thereof.

The ethylene may be selected from any conventional ethylenes, and preferably includes one or more selected from the group consisting of ethylene propylene rubber (EPR), ethylene propylene diene monomer (EPDM) rubber, ethylene butene rubber (EBR), ethylene octene rubber (EOR), and the like. According to an exemplary embodiment, the ethylene is ethylene octene rubber (EOR).

In particular, the ethylene octene rubber may be included in order to overcome the drawback of adding the thermoplastic olefin resin to the bio resin composition, which is low strength and odor. By including the ethylene octene rubber in the composition, the ethylene octane rubber is combined with the inorganic filler, thereby imparting melt strength similar to that of the thermoplastic olefin resin to the composition, and enhancing the effect of alleviating odor of the composition.

The grade of the ethylene octene rubber is classified depending on the content of octane. The content of octene is preferably about 40 to 50% by weight, and more preferably about 40 to 45% by weight, based on the total weight of the ethylene octene rubber.

When the content of octene is less than about 40% by weight, the processability of the composition is reduced to the standard level or less. On the other hand, when the content of octene exceeds about 50% by weight, hardness of the composition is reduced, and thus texture of the surface is enhanced, but there is a problem in that calendering processability may be reduced.

In addition, the content of the thermoplastic rubber is preferably about 5 to 40 parts by weight based on 100 parts by weight of the bio polyethylene resin. When the content of the thermoplastic rubber is less than an about 5 parts by weight, there is a problem in that the melt strength of the composition is reduced, and thus sagging property of the bio molded article may become so severe that when the bio resin composition is subjected to vacuum molding, wrinkles may be generated on the surface of the bio molded article. On the other hand, and when the content thereof exceeds about 40 parts by weight, there is a problem in that odors may be generated from the bio composition and the bio molded article.

2. Use

The bio molded article which is prepared from the bio resin composition may be applied to flooring materials, decoration sheets, films, and the like. In particular, it is preferred that the bio molded article is manufactured in the form of a sheet, a film, or the like and can, thus, be suitably applied to automotive interior and exterior materials. Since the bio molded article has excellent physical properties, such as solvent resistance, abrasion resistance, scratch resistance, light resistance, chemical resistance, and the like, and is environmentally friendly, an odor is not caused when the bio molded article is applied to an automobile, and conditions of the interior of the automobile may be enhanced when the bio molded article is applied to the surface of automotive interior parts.

3. Manufacturing Method

Hereinafter, a method of manufacturing a bio molded article will be described.

According to an embodiment, the present invention provides a method of manufacturing a bio molded article which includes about 200 to 350 parts by weight of a thermoplastic olefin resin, about 10 to 20 parts by weight of a polypropylene resin, and about 10 to 20 parts by weight of an inorganic filler, based on 100 parts by weight of a bio polyethylene resin.

More specifically, it is preferred that the method of manufacturing a bio molded article includes a step of preparing a mixture by uniformly mixing about 200 to 350 parts by weight of a thermoplastic olefin resin, about 10 to 20 parts by weight of a polypropylene resin, about 10 to 20 parts by weight of an inorganic filler, and the like, based on 100 parts by weight of a bio polyethylene resin; a step of preparing a melt by melting the uniformly mixed mixture; and a step of manufacturing a bio molded article by passing the melt through a calender roll.

Here, it is preferred that the method of melting the mixture is performed by any conventional method, such as using a single screw extruder, a twin screw extruder, a kneader, or a Banbury mixer and the like. Furthermore, it is preferred that the calendering is performed by using a conventional method known in the art to which the present invention pertains.

Hereinafter, the present invention will be described in more detail through the following Examples. These Examples are only for illustrating the present invention, and it will be obvious to those skilled in the art that the scope of the present invention is not interpreted to be limited by these Examples.

Example

Physical properties tests were performed by comparing the constituent components and contents in Examples and Comparative Examples according to the present invention, and the results are summarized in the following Tables 1 and 2.

TABLE 1

| Classification | Unit | Example | | | Comparative Example | | |
| --- | --- | --- | --- | --- | --- | --- | --- |
| | | 1 | 2 | 3 | 1 | 2 | 3 |
| Bio polyethylene resin | % by weight | 20 | 25 | 25 | — | 25 | 25 |
| Thermoplastic olefin resin | % by weight | 65 | 66 | 64 | 65 | 60 | 70 |
| Polypropylene resin | % by weight | 3 | 3 | 3 | 3 | 2 | 2 |
| Calcium carbonate filler | % by weight | 4 | 4 | 4 | 4 | 3 | 3 |
| Ethylene octene rubber resin | % by weight | 8 | 2 | 2 | 8 | — | — |
| LDPE resin | % by weight | — | — | — | 20 | 10 | — |

PP resin: B 330F, SK Energy Corp.
Calcium carbonate filler: White-H, Omya Co., Ltd.
Ethylene octene rubber (EOR) resin: Engage8180, DOW
LDPE: low density polyethylene resin Table 1 shows the results of comparing the constituent components and contents in Examples 1 to 3 and Comparative Examples 1 to 3. Examples 1 to 3 were in accordance with the present invention and included a bio polyethylene resin, a thermoplastic olefin resin, a polypropylene resin, calcium carbonate, and an ethylene octene rubber (EOR) resin, with varying amounts thereof.

Further, Comparative Examples 1 to 3 were similar to the Examples in terms of constituent components, but Comparative Example 1 included a low density polyethylene resin instead of a bio polyethylene resin, Comparative Example 2 included a bio polyethylene resin in the same manner as in the Examples, but included a low density polyethylene resin instead of an ethylene octene rubber resin, and Comparative Example 3 is similar to the Examples in terms of constituent components, but did not include an ethylene octene rubber resin.

The results of physical properties tests performed on the Examples and the Comparative Examples, which had the aforementioned constituent components and contents, were compared with each other and are set forth in the following Table.

TABLE 2

| Classification | Unit | Example | | | Comparative Example | | |
| --- | --- | --- | --- | --- | --- | --- | --- |
| | | 1 | 2 | 3 | 1 | 2 | 3 |
| Tensile strength | Kgf/cm$^2$ | 173 | 167 | 185 | 140 | 135 | 125 |
| Tear strength | kgf/cm | 8.5 | 8.5 | 8.1 | 7.4 | 7.9 | 7.5 |
| Elongation rate | % | 718 | 739 | 738 | 739 | 592 | 642 |
| Heat aging resistance | Grade | 4 | 4 | 4 | 4 | 4 | 3 |
| Light aging resistance | Grade | 4 | 4 | 4 | 4 | 3 | 4 |
| Chemical resistance | Grade | 4 | 4 | 4 | 4 | 4 | 3 |
| Sun-cream resistance | — | Good | Good | Good | Good | Good | Good |
| Odor | Grade | 4 | 4 | 4 | 4 | 2 | 3 |
| Calendering processability | — | Good | Good | Good | Good | Bad | Good |
| Vacuum/Injection moldability | — | Good | Good | Good | Good | Bad | Bad |
| Adhesiveness within injection resin | — | Good | Good | Good | Good | Good | Bad |

Table 2 is a comparison table of the results of physical properties tests in Examples 1 and 2 and Comparative Examples 1 to 3.

The tensile strength and elongation rate were measured using a tensile tester in accordance with ASTM D 638, and a maximum load and an elongation rate on a predetermined area were measured under the conditions of a test rate of 200 mm/minute, a distance between reference points of 70 mm, and a first type test specimen.

The tear strength was denoted as a load average of local maximum values by clamping a dumbbell B type test specimen (the test specimen being shaped like a dumbbell) to the tensile tester in accordance with KS M6518 and tearing the specimen under condition of a tensile rate of 200 mm/minute.

The grade of the heat aging resistance was obtained by allowing the test specimen to stand in a forced convection oven, which had been maintained at a temperature of 110±2° C., for 300 hours and determining ΔEcmc at 45 degrees by a spectrophotometer and a visual difference in discoloration with the gray scale prescribed in ISO 105-A02.

The grade of the light aging resistance was obtained by irradiating the test specimen at a black panel temperature of 89±3° C., a controlled humidity of 50±5% RH, and 126 MJ/m² by a tester prescribed in accordance with ISO 105, and determining a visual difference in discoloration with the gray scale prescribed in ISO 105-A02.

The grade of the chemical resistance was obtained by repeatedly polishing the outer surface of the composition 10 times with a gauze which had been sufficiently immersed in a test solution described in the following Table 3, allowing the outer surface of the composition to stand at room temperature for 1 hour, and then determining a visual difference in discoloration with the gray scale described in ISO 105-A02.

TABLE 3

| Test solution | Description |
| --- | --- |
| Glass cleaner | Weak alkaline glass cleaner |
| Cleaning agent | Mixture of 95% distilled water and 5% neutral detergent |
| Washer fluid | Mixture of 50% isopropyl alcohol and 50% distilled water |
| Gasoline | Unleaded gasoline |
| Polish wax | HMC |

Table 3 is a table in which test solutions have been summarized in order to check the chemical resistance.

The sunscreen resistance was obtained by piling two sheets of white cotton tissue having the same size overlapped with one-another on an aluminum plate (50 mm×50 mm) in accordance with GMN 10033, coating 0.25 g of sunscreen (Coppertone Waterbabies SPF 45) on the entire surface thereof, placing the aluminum plate on a test product, adhering the test product to the aluminum plate with a load of 500 g, allowing the assembly to stand in a constant temperature bath at 80±2° C. for 1 hour, taking out the assembly, removing the white cotton tissue and the aluminum plate from the assembly, allowing the test product to stand at normal temperature for 10 to 15 minutes, washing the test product with a neutral detergent, drying the test product, and then evaluating differences in change of color and discoloration with naked eye. The test product was determined as excellent when there is little change of color and discoloration, good when a change of color and discoloration are negligible, ordinary when a change of color and discoloration occur without abnormality to the quality, and bad when a change of color and discoloration are severe.

The odor was evaluated by heating a 4 L-glass vessel at 100° C. for 1 hour, allowing the vessel to stand at normal temperature for 1 hour to volatilize the odor in the glass vessel, cutting the test specimen into a 50 mm×60 mm piece, heating the test specimen again at 100° C. for 2 hours, taking out the test specimen, allowing the test specimen to stand at room temperature (23±2° C.) for 60 minutes to cool the test specimen, and then uncapping the vessel by approximately 3 to 4 cm. The degree of odor generation was quantified by assigning 5 points to the severe case of odor generation, 3 points to the ordinary case of odor generation, and 1 point to the case of little odor generation.

The calender processability was evaluated by producing a seat for each composition in a calendering facility in which a bio molded composition is molten, compressed between rolls, and processed in a seat form, and confirming the workability and surface state with the naked eye. When unmelted resin compositions are remaining on the surface, or an irregular aspect occurs on the surface due to reduced flowability, the specimen was determined to be bad, and if these problems were not present was determined to be good.

The vacuum/injection moldability was evaluated by determining whether the bio molded sheet, which was subjected to a calendering process, a surface treatment process, and a lamination process, had a problem in appearance during vacuum molding and injection molding. When a difference in sagging property occurred according to the melting strength of the resin during vacuum molding, bursting and a rapid reduction in thickness of the bio molded sheet occurred. The reduction in thickness was determined as good when the site of the passenger air bag (PAB) was 0.60 mm or more.

Adhesiveness with the injected resin was evaluated as adhesiveness with the injected resin after vacuum molding. The adhesiveness was determined as good in the case where peeling off did not occur at all when the bio molded sheet was forcibly peeled off for each site after injection, and determined as bad in the case where peeling off occurred.

Accordingly, in terms of tensile strength, tear strength, and an elongation rate, which are items for evaluating mechanical properties among the evaluation items in Examples 1 to 3 in Table 2, most of the Examples had better results than those of the Comparative Examples. In addition, from the fact that results in Examples 1 to 3, which were equivalent to or better than the Comparative Examples, were obtained in terms of product processability, moldability, and reliability, it was demonstrated that in the Examples according to the present invention, the molded composition had no problem in physical properties.

Specifically, in Comparative Example 2, which included a thermoplastic olefin resin and a polypropylene resin in contrast with the present invention, unmelted portions occurred during calendering processing, and thus the surface state thereof was had and a sagging property was reduced during vacuum molding. As such, there was a problem in that the site of a passenger air bag was molded to have a thickness of 0.60 mm or less. Furthermore, in Comparative Example 3, calendering processability was good, but the content of the thermoplastic olefin resin was high. As a result, discoloration occurred when light aging resistance and heat aging resistance were evaluated, and adhesion force with the injection resin was bad.

Further, an evaluation of physical properties in Examples 1 to 3, demonstrated that the bio resin composition of the present invention may be subjected to vacuum molding and injection molding while maintaining calendering processability that is a primary processing.

Therefore, the present invention includes a bio polyethylene resin that is disadvantageous in possessing a weak processability and moldability, but it was demonstrated that it was possible to obtain physical properties which were superior to those in the related art, by further including a thermoplastic olefin resin, a polypropylene resin, a thermoplastic rubber, and the like. Further, the present invention is environmentally friendly because a bio polyethylene resin is used, which generates less carbon dioxide than in the related art.

Test Example

Seats were produced in a calendering facility in which the compositions in Examples 1 to 3 and Comparative Example 1 of Table 2 were molten, compressed between rolls, and then processed in a seat form. In Examples 1 to 3, surface treatment was performed by exposing the seat to an electron beam, and in Comparative Example 1, a polymerization initiator was used, and then surface treatment was performed by exposing the seat to UV rays.

In Examples 1 to 3 and the Comparative Example, which were formed through the surface treatment process, total volatile organic compounds (TVOC) were measured by using a device of measuring total volatile organic compounds (TVOC). The total volatile organic compounds are referred to as a value derived by collectively measuring and converting all the volatile organic compounds in the air because it is complicated and difficult to measure individual concentrations of volatile organic compounds (VOC) and quantify the concentrations.

In addition, based on Article 7(2) of the Industrial Safety and Health Act, the recommended standard on indoor air quality stipulates that the total volatile organic compounds shall be at 500 μg/m$^3$ or less, benzene shall be at 30 μg/m$^3$ or less, toluene shall be at 1,000 μg/m$^3$ or less, ethylbenzene shall be at 360 μg/m$^3$ or less, xylene shall be at 700 μg/m$^3$ or less, and stylene shall be at 300 μg/m$^3$ or less.

Hereinafter, the total volatile organic compounds and various volatile organic compounds in Examples 1 to 3 and Comparative Example 1 were measured, and the results are shown in the following Table.

TABLE 4

| Classification | Unit | Example 1 | Example 2 | Example 3 | Comparative Example 1 |
|---|---|---|---|---|---|
| TVOC | μg/m$^3$ | 161 | 142 | 148 | 687 |
| Benzene VOC | μg/m$^3$ | <10 | <10 | <10 | <10 |
| Toluene VOC | μg/m$^3$ | 770 | 630 | 650 | 27,000 |
| Ethylbenzene VOC | μg/m$^3$ | 290 | 170 | 250 | 10,800 |
| Xylene VOC | μg/m$^3$ | 118 | 82 | 100 | 7,400 |
| Stylene VOC | μg/m$^3$ | <10 | <10 | <10 | <10 |
| Formaldehyde VOC | μg/m$^3$ | 95 | 52 | 73 | 56 |

As shown, in the case of Examples 1 to 3, in which surface treatment was performed by an electron beam, the values of total volatile organic compounds (TVOC), as well as volatile organic compounds (VOC), such as benzene, toluene, ethylbenzene, xylene, and stylene, were all within the allowed range of the recommended standard on indoor air quality.

However, in the case of Comparative Example 1, it was demonstrated that the values of total volatile organic compounds (TVOC), as well as the values of volatile organic compounds (VOC), such as benzene, toluene, ethylbenzene, xylene, and stylene, were all outside of the allowed range of the recommended standard on indoor air quality.

Accordingly, it was demonstrated that Examples 1 to 3, which included the bio polyethylene resin, were more environmentally friendly than Comparative Example 1, which included a low density polyethylene resin. It was further demonstrated that the resin composition of the present invention reduced the emission of volatile organic compounds (VOC), is environmentally friendly and may be recycled for another use through regenerated processing.

As described above, the present invention has been described in relation to specific embodiments of the present invention, but the embodiments are only illustration and the present invention is not limited thereto. Embodiments described may be changed or modified by those skilled in the art to which the present invention pertains without departing from the scope of the present invention, and various alterations and modifications are possible within the technical spirit of the present invention and the equivalent scope of the claims which will be described below.

What is claimed is:

1. A bio resin composition comprising:
   100 parts by weight of a bio polyethylene resin, about 200 to 350 parts by weight of a thermoplastic olefin resin, about 10 to 20 parts by weight of a polypropylene resin, and about 10 to 20 parts by weight of an inorganic filler,
   wherein the polypropylene resin has a number average molecular weight of about 30,000 to 40,000, a melting index of about 25 to 40 g/10 minutes (230° C., 2.16 kg), a specific weight of about 0.89 to 0.91, a Shore A hardness of about 90 to 97, and an elongation rate at break of about 20 to 30% in order to minimize increases in elongation rate of the composition, wherein the elongation rate at break is measure in accordance with ASTM D638 on a predetermined area and measured under conditions of a test rate of 200 mm/minute and a distance between points of 70 mm and a first type test specimen,
   wherein the bio polyethylene resin is obtained by polymerizing ethylene produced by dehydrating bioethanol,
   wherein the thermoplastic olefin resin is not the bio polyethylene resin nor the polypropylene resin.

2. The bio resin composition of claim 1, wherein the inorganic filler comprises one or more selected from the group consisting of calcium carbonate, calcium oxide, mica, and talc.

3. The bio resin composition of claim 1, further comprising:
   about 5 to 40 parts by weight of a thermoplastic rubber, based on 100 parts by weight of the bio polyethylene resin.

4. The bio resin composition of claim 3, wherein the thermoplastic rubber is a copolymer of ethylene and a $C_2$ to $C_{10}$ α-olefin.

5. The bio resin composition of claim 4, wherein the $C_2$ to $C_{10}$ α-olefin comprises one or more selected from the group consisting of propylene, butene, pentene, hexene, and octene.

6. The bio resin composition of claim 3, wherein the thermoplastic rubber is one or more selected from the group consisting of ethylene-propylene rubber (EPR), ethylene-propylene-diene monomer (EPDM) rubber, ethylene-butene rubber (EBR), and ethylene-octene rubber (EOR).

7. A bio molded article manufactured from the bio resin composition of claim 1.

8. A method of manufacturing a bio molded article, the method comprising:
   preparing a mixture by uniformly mixing 100 parts by weight of a bio polyethylene resin, about 200 to 350 parts by weight of a thermoplastic olefin resin, about 10 to 20 parts by weight of a polypropylene resin; and about 10 to 20 parts by weight of an inorganic filler,
   wherein the polypropylene resin has a number average molecular weight of about 30,000 to 40,000, a melting index of about 25 to 40 g/10 minutes (230° C., 2.16 kg), a specific weight of about 0.89 to 0.91, a Shore A hardness of about 90 to 97, and an elongation rate at break of about 20 to 30% in order to minimize increases in elongation rate of the composition, wherein the elongation rate at break is measured in accordance with ASTM D638 on a predetermined area and measured under conditions of a test rate of 200 mm/minute and a distance between points of 70 mm and a first type test specimen;

preparing a melt by melting the mixture; and
manufacturing the bio molded article by passing the melt through a calender roll,
wherein the bio polyethylene resin is obtained by polymerizing ethylene produced by dehydrating bioethanol,
wherein the thermoplastic olefin resin is not the bio polyethylene resin nor the polypropylene resin.

* * * * *